United States Patent
Hsiao

(10) Patent No.: US 12,402,073 B2
(45) Date of Patent: Aug. 26, 2025

(54) CONTROL METHOD OF USER EQUIPMENT WITH ADAPTIVE SYSTEM SELECTION STRATEGY

(71) Applicant: MEDIATEK INC., Hsin-Chu (TW)

(72) Inventor: Po-Wen Hsiao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 379 days.

(21) Appl. No.: 17/844,716

(22) Filed: Jun. 21, 2022

(65) Prior Publication Data

US 2023/0026195 A1 Jan. 26, 2023

Related U.S. Application Data

(60) Provisional application No. 63/221,975, filed on Jul. 15, 2021.

(51) Int. Cl.
*H04W 52/02* (2009.01)

(52) U.S. Cl.
CPC .............................. *H04W 52/0225* (2013.01)

(58) Field of Classification Search
CPC .... H04B 7/0695; H04B 7/0617; H04W 24/10
See application file for complete search history.

(56) References Cited

U.S. PATENT DOCUMENTS

| | | | |
|---|---|---|---|
| 2013/0121194 A1* | 5/2013 | Heshmati | H04W 52/0258 370/252 |
| 2013/0316699 A1* | 11/2013 | Jheng | H04W 48/18 455/423 |
| 2015/0156713 A1 | 6/2015 | Song | |
| 2016/0013878 A1* | 1/2016 | Zhao | H04J 11/0023 370/329 |
| 2017/0070904 A1 | 3/2017 | Mali | |
| 2017/0094589 A1 | 3/2017 | Bhasin | |
| 2019/0239238 A1 | 8/2019 | Calabrese | |
| 2020/0329338 A1 | 10/2020 | Lovlekar | |
| 2020/0351066 A1* | 11/2020 | Cirik | H04L 5/0098 |
| 2021/0194563 A1* | 6/2021 | Zhang | H04W 24/10 |
| 2022/0015100 A1* | 1/2022 | Yerramalli | H04L 5/0023 |

FOREIGN PATENT DOCUMENTS

| | | | |
|---|---|---|---|
| CN | 108668329 A | 10/2018 | |
| CN | 112243278 A | 1/2021 | |

* cited by examiner

*Primary Examiner* — Derrick W Ferris
*Assistant Examiner* — Won Jun Choi
(74) *Attorney, Agent, or Firm* — Winston Hsu

(57) ABSTRACT

The present invention provides a control method of an electronic device, wherein the control method includes the steps of: obtaining a first measurement result of frequencies of one or more bands; obtaining a second measurement result of the frequencies of the one or more bands, wherein the first measurement result and the second measurement result are generated at different times; determining a similarity between the second measurement result and the first measurement result to generate a determination result; and determining a system selection strategy according to the determination result.

6 Claims, 6 Drawing Sheets

CONTROL METHOD OF USER EQUIPMENT WITH ADAPTIVE SYSTEM SELECTION STRATEGY

CROSS REFERENCE TO RELATED APPLICATIONS

This application claims the benefit of U.S. Provisional Application No. 63/221,975, filed on Jul. 15, 2021. The content of the application is incorporated herein by reference.

BACKGROUND

When an user equipment (UE) moves to a limited or no service area, such as a basement, the UE always triggers regularly recovery search for detecting a normal service according to 3rd Generation Partnership Project (3GPP) 36.304 and 38.304. The recovery search comprises the step of finding a suitable cell by trying all frequencies of all radio access technologies (RATS) that are supported by the UE, causing high power consumption. Therefore, if the UE is located in an area without normal service for a long time, the UE will continue to perform redundant recovery search regularly, resulting in high power consumption and the power of the UE will drop rapidly.

SUMMARY

It is therefore an objective of the present invention to provide a control method of the UE, which can use an adaptive system selection strategy to avoid the high power consumption caused by the conventional recovery search in the prior art.

According to one embodiment of the present invention, a control method of an electronic device is disclosed. The control method comprises the steps of: obtaining a first measurement result of frequencies of one or more bands; obtaining a second measurement result of the frequencies of the one or more bands, wherein the first measurement result and the second measurement result are generated at different times; determining a similarity between the second measurement result and the first measurement result to generate a determination result; and determining a system selection strategy according to the determination result.

According to one embodiment of the present invention, a circuitry of an electronic device is disclosed, wherein the circuitry is configured to perform the steps of: obtaining a first measurement result of frequencies of one or more bands; obtaining a second measurement result of the frequencies of the one or more bands, wherein the first measurement result and the second measurement result are generated at different times; determining a similarity between the second measurement result and the first measurement result to generate a determination result; and determining a system selection strategy according to the determination result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
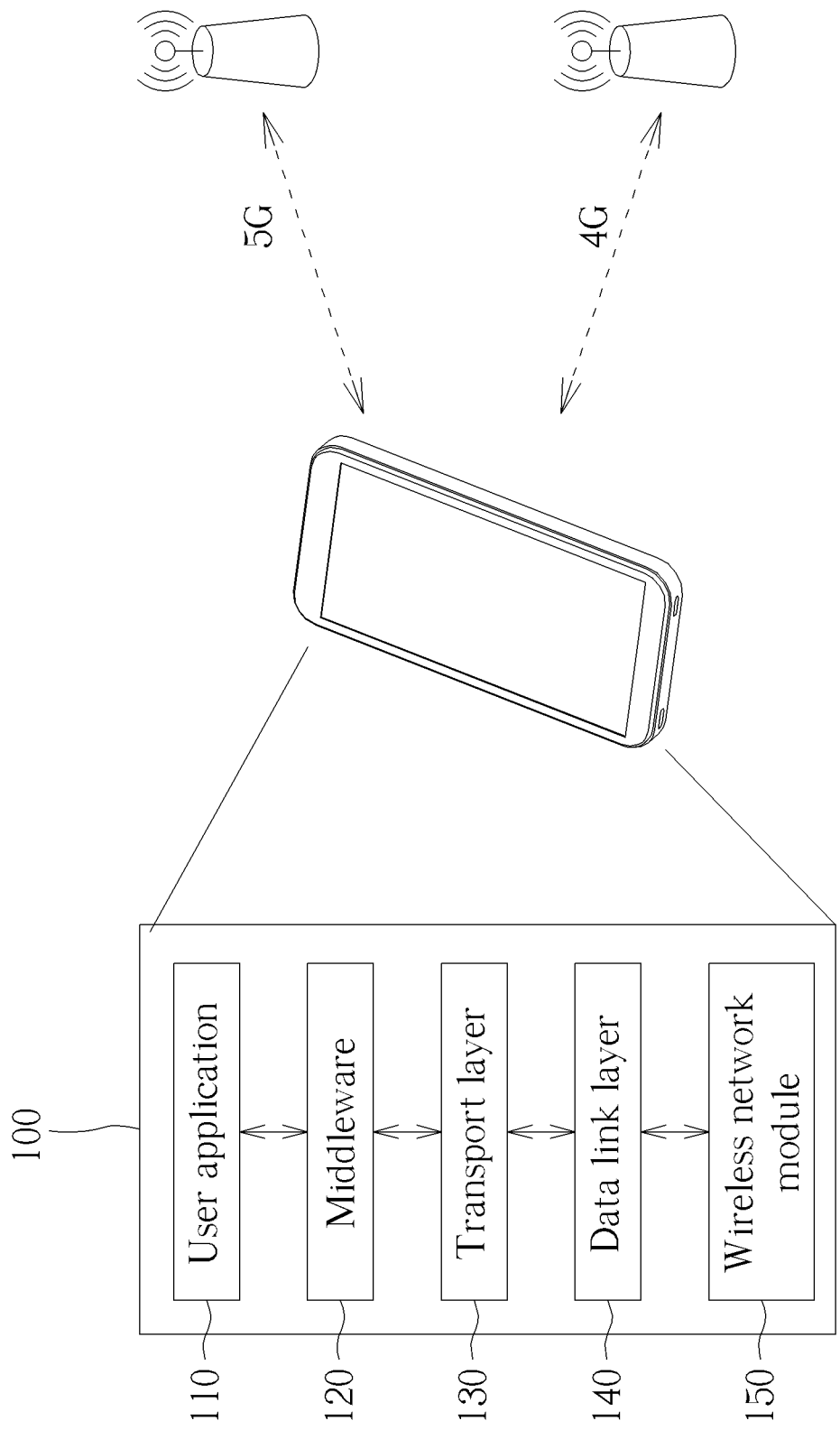
FIG. 1 shows a communication system according to one embodiment of the present invention.

FIG. 1 shows a communication system according to one embodiment of the present invention. As shown in FIG. 1, an UE 100 comprises a circuitry comprising an application processor for executing operations of an user application 110, a middleware 120, a transport layer 130, a data link layer 140, and circuitry further at least one wireless network module 150. In this embodiment, the UE 100 may be a portable electronic device such as a cell phone or a tablet, and the UE 100 can use the wireless network module 150 to establish a link with a cellular base station for a network system such as a fourth generation of broadband cellular network technology (hereinafter, 4G) system or a fifth generation of broadband cellular network technology (hereinafter, 5G) system, or a next generation of broadband cellular network technology and legacy network technology (hereinafter, 2G and 3G) system.

As described in the background of the invention, when the UE 100 is taken into a limited or no service area, such as a basement, the UE 100 will trigger regularly recovery search for detecting a normal service according to the 3GPP specification. In order to lower the power consumption of the UE 100 when the UE 100 stays in the area without service for a long time, the embodiment shown in FIG. 2 provides a control method of the UE 100 to select an appropriate system selection procedure strategy according to a measurement result of frequencies/channels of one or more bands, wherein the system selection procedure strategies that can be used by the UE 100 may comprise different cell search strategies, different public land mobile network (PLMN) and RAT selection strategy, and/or different system capability control strategy.

Figure 2:
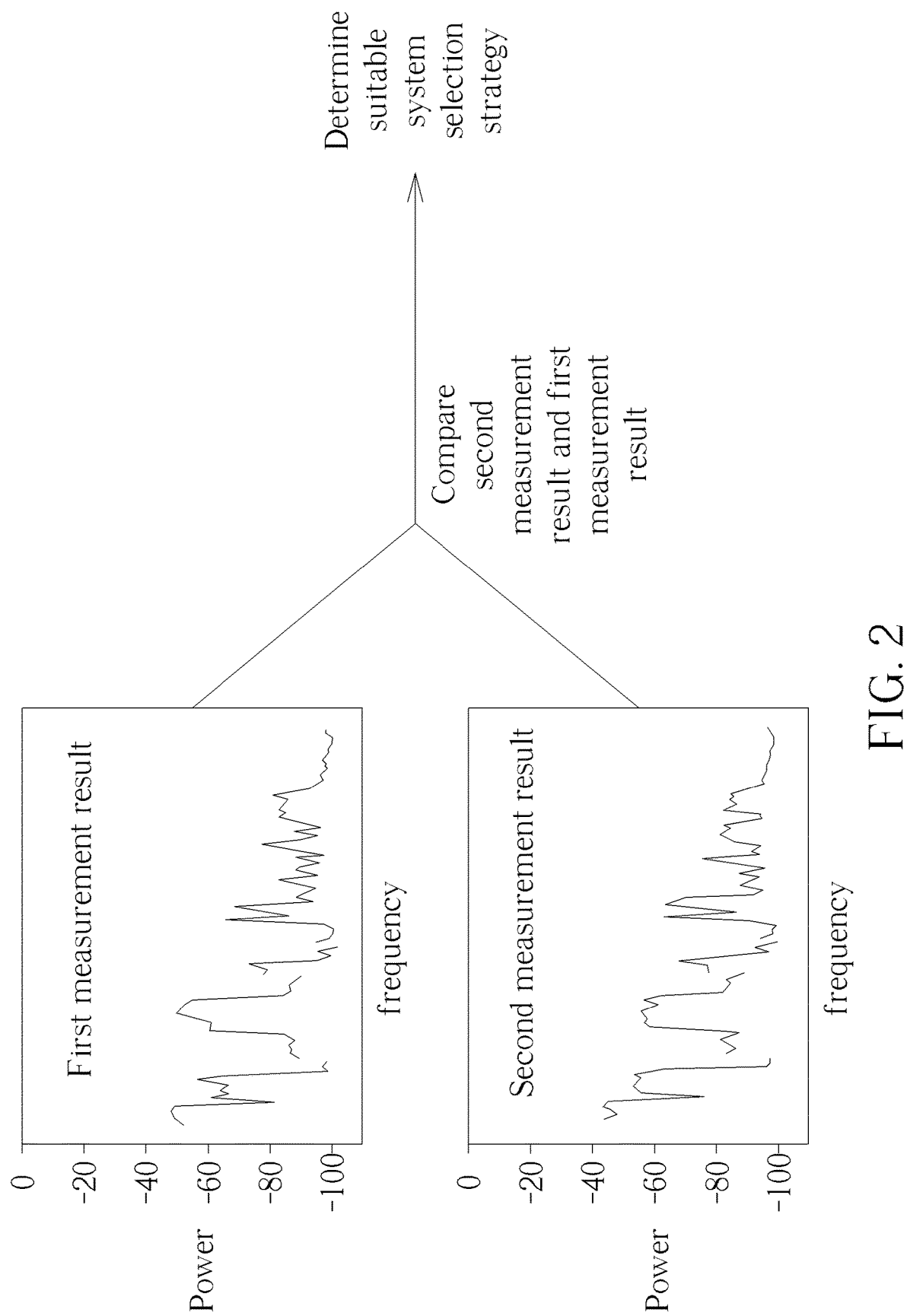
FIG. 2 shows a control method of UE based on measurement results of frequencies/channels of or more bands.

Referring to FIG. 2, at a first time, the wireless network module 150 of the UE 100 obtains a first measurement result by performing a power scan operation for frequencies/channels of one or more bands, then at a second time, the wireless network module 150 of the UE 100 may obtain a second measurement result by performing the power scan operation for the frequencies/channels of one or more bands. Then, the first measurement result and the second measurement result are compared to determine a similarity between the second measurement result and the first measurement result, for determining the suitable system selection procedure strategy for the UE 100. For example, if the second measurement result is similar to the first measurement result, the wireless network module 150 can determine that the UE 100 may be locate in the same area, and the wireless network module 150 can use a first system selection procedure strategy at the next time. For example, if the UE 100 is located in the basement without service and the first measurement result and the second measurement are generated, in response to the second measurement result being similar to the first measurement result, the wireless network module 150 may not perform the cell search or the PLMN and RAT selection, or reduce the redundant cell search, to avoid performing actions that do not achieve the desired effect. In another example, if the UE 100 is without service at the first time and the first measurement result is generated, then the second measurement result is generated at the second time, in response to the second measurement result being not similar to the first measurement result, the wireless network module 150 may perform a normal recovery search because the UE 100 may move to an area having service now.

Figure 3:
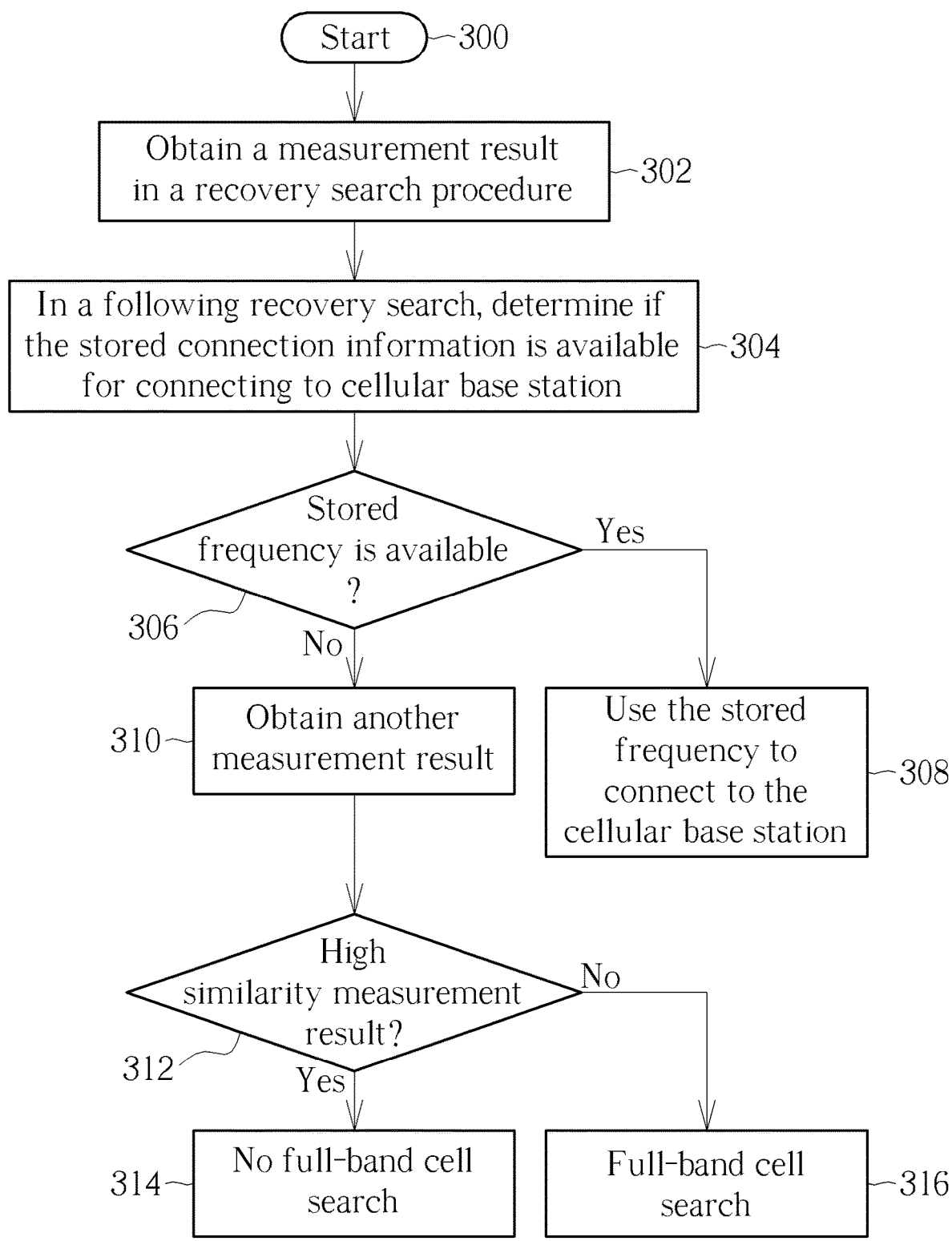
FIG. 3 is a diagram illustrating a control method of the UE according to a first embodiment of the present invention.

FIG. 3 is a diagram illustrating a control method of the UE 100 according to a first embodiment of the present invention. As shown in FIG. 3, in step 300, the flow starts, and the UE 100 is connected to a cellular base station of a system. In Step 302, the UE 100 cannot receive the signal from the cellular base station due to some reason, that is the UE 100 is out of wireless communication service, and the UE 100 starts to perform a recovery search and obtain a measurement result of frequencies/channels of one or more bands. Specifically, referring to FIG. 4, initially, because the initial memory within the UE 100 stores the previous connection information (e.g., the information of the cellular base station of the 4G/5G system), the wireless network module 150 may determine if the frequency of the stored connection information is available for connecting to the cellular base station of the 5G system, if yes, the UE 100 can establish a link with the cellular base station, and the procedure of the recovery search is finished; and if not, the wireless network module 150 detect power of all the frequencies or part of the frequencies of several bands to obtain a measurement result of frequencies/channels, wherein these frequencies/channels comprise at least part of standalone architecture (SA) FR1 and FR2 bands of the 5G system. In this embodiment, the power of each frequency/channel in the measurement result can be received signal strength indicator (RSSI), a reference signal receiving power (RSRP), a reference signal received quality (RSRQ), a signal to interference plus noise ratio (SINR), or any suitable power indicator. After obtaining the measurement result, the wireless network module 150 performs cell search to try to connect to the cellular base station of the 5G system based on the measurement result.

Then, if the UE 100 cannot connect to the 5G system, the wireless network module 150 may determine if the frequency of the stored connection information is available for connecting to the cellular base station of the 4G system, if yes, the UE 100 can establish a link with the cellular base station of the 4G system, and the procedure of the recovery search is finished; and if not, the wireless network module 150 detect power of all the frequencies or part of the frequencies of several bands to obtain a measurement result of frequencies/channels, wherein these frequencies/channels comprise at least part of bands B1-B71 of the 4G system. In this embodiment, the power of each frequency/channel in the measurement result can be RSSI, RSRP, RSRQ, SINR, or any suitable power indicator. After obtaining the measurement result, the wireless network module 150 tries to connect to the cellular base station of the 4G system based on the measurement result. Similarly, the wireless network module 150 may also try to connect to the bands of the 3G or 2G system.

Figure 4:
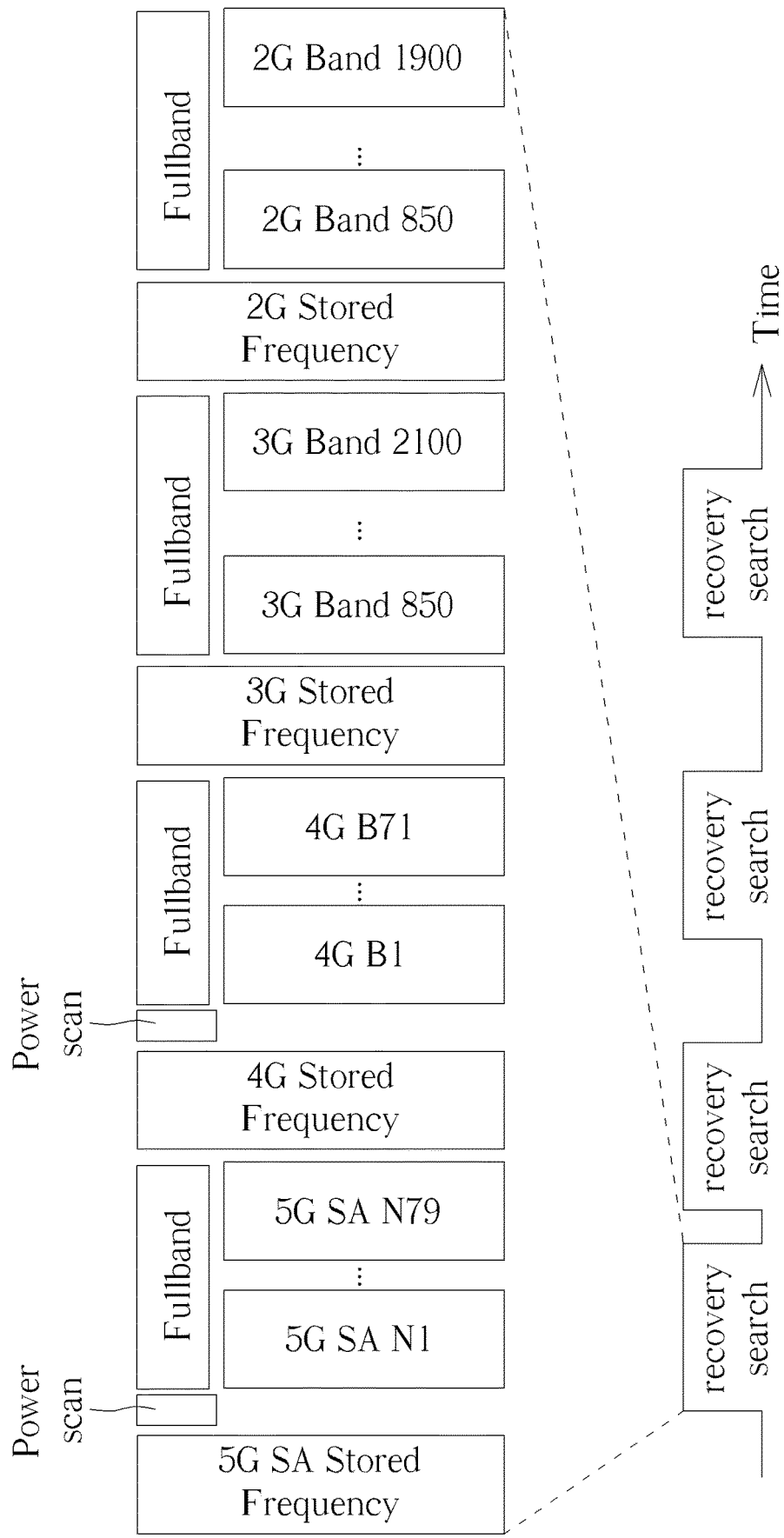
FIG. 4 shows steps of recovery search of the UE.

It is noted that the flow of the recovery search shown in FIG. 4 is for illustrative purposes only, not a limitation of the present invention. In one embodiment that the UE 100 does not have the 5G service, the flow for generating the measurement result and performing cell search of the 5G system can be removed.

In this embodiment, the measurement result of the 5G system and/or the measurement result of the 4G system can be temporarily stored in a buffer of the wireless network module 150.

In Step 304, because the UE 100 cannot have service in the above recovery search, in a next recovery search, initially the wireless network module 150 determines if the frequency of the stored connection information is available for connecting to the cellular base station of the 5G system and/or the 4G system, if yes, the flow enters Step 308 to use the stored connection information to connect to the cellular base station, and the recovery search procedure is finished; and if not, the flow enters Step 310.

In Step 310, the wireless network module 150 detects power of all the frequencies or part of the frequencies of several bands to obtain a measurement result of frequencies/channels, wherein these frequencies/channels comprise at least part of SA FR1 and FR2 bands of the 5G system and/or at least part of bands B1-B71 of the 4G system.

In Step 312, the wireless network module 150 determines the measurement result obtained in Step 310 is similar to the measurement result obtained in Step 302, if yes, the flow enters Step 314; and if not, the flow enters Step 316. In this embodiment, the wireless network module 150 may use any suitable algorithm to determine the similarity between these two measurement results, such as calculating a distance between two measurement results, or using a suitable artificial intelligence (AI) model to calculate a difference between two measurement results. Then the wireless network module 150 can determine if the difference between two measurement results is within a range or lower than a threshold value to determine the similarity between these two measurement results. For example, if the difference between two measurement results is within the range or lower than the threshold value, the wireless network module 150 determines that the measurement result obtained in Step 310 is similar to the measurement result obtained in Step 302; and if the difference between two measurement results is not within the range or not lower than the threshold value, the wireless network module 150 determines that the measurement result obtained in Step 310 is not similar to the measurement result obtained in Step 302.

In Step 314, the wireless network module 150 determines that the UE 100 may be located in the same area without service, so the wireless network module 150 may not perform a full-band cell search for the 5G or 4G system. For example, the wireless network module 150 does not perform cell search on at least part of the SA FR1 and FR2 bands of the 5G system, and/or the wireless network module 150 does not perform cell search on at least part of the bands B1-B71 of the 4G system.

In one embodiment, the recovery search performed in Step 314 is band-independent, that is the wireless network module 150 does not perform cell search on the bands whose measurement result is with high similarity to the previous measurement result, but the wireless network module 150 may perform cell search on the bands whose measurement result is with low similarity to the previous measurement result.

In addition, after the Step 314, the flow enters Step 304 again, and the UE 100 performs the next recovery search and determines the similarity between the current measurement result and the previous measurement result(s) to determine a suitable system selection strategy.

In Step 316, the wireless network module 150 determines that the UE 100 may be moved to an area with service, so the wireless network module 150 may perform a cell search on all the possible frequencies of the 5G or 4G system.

Figure 5:
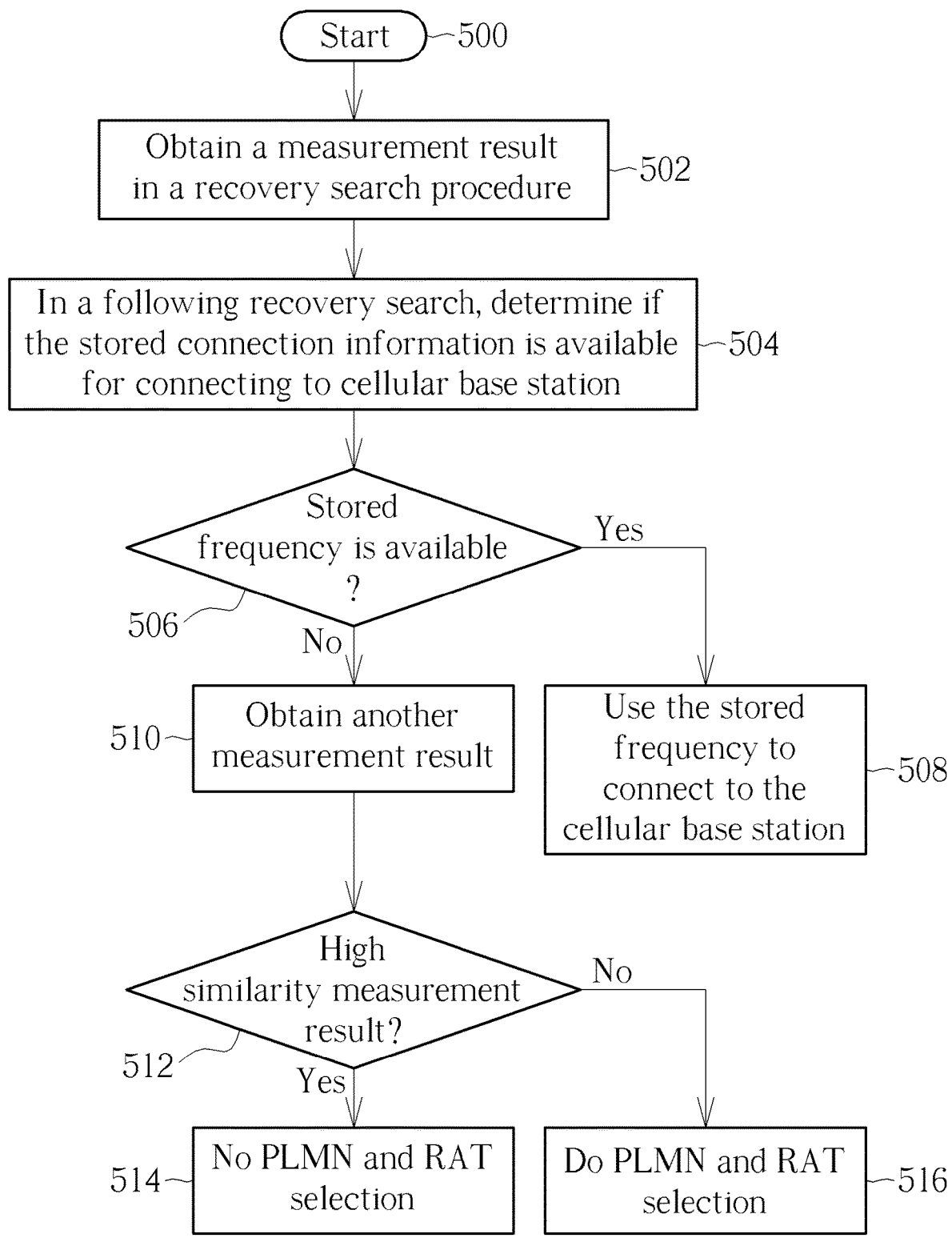
FIG. 5 is a diagram illustrating a control method of the UE according to a second embodiment of the present invention.

FIG. 5 is a diagram illustrating a control method of the UE 100 according to a second embodiment of the present invention. As shown in FIG. 5, in step 500, the flow starts, and the UE 100 is connected to a cellular base station of a system such as the 5G system or the 4G system. In Step 502, the UE 100 cannot receive the signal from the cellular base station due to some reason, that is the UE 100 is out of wireless communication service, and the UE 100 starts to perform a recovery search and obtain a measurement result of frequencies/channels of one or more bands. For example, the measurement result can be generated according to the above embodiment shown in FIG. 4.

In this embodiment, the measurement result of frequencies/channels of one or more bands can be temporarily stored in a buffer of the wireless network module 150.

In Step 504, because the UE 100 cannot have service in the above recovery search, in a next recovery search, initially the wireless network module 150 determines if the frequency of the stored connection information is available for connecting to the cellular base station of the 5G system and/or the 4G system, if yes, the flow enters Step 508 to use the stored connection information to connect to the cellular base station, and the recovery search procedure is finished; and if not, the flow enters Step 510.

In Step 510, the wireless network module 150 detects power of all the frequencies or part of the frequencies of one or more bands to obtain a measurement result of frequencies/channels, wherein these frequencies/channels comprise at least part of SA FR1 and FR2 bands of the 5G system and/or at least part of bands B1-B71 of the 4G system.

In Step 512, the wireless network module 150 determines the measurement result obtained in Step 510 is similar to the measurement result obtained in Step 502, if yes, the flow enters Step 514; and if not, the flow enters Step 516. In this embodiment, the wireless network module 150 may use any suitable algorithm to determine the similarity between these two measurement results, such as calculating a distance between two measurement results, or using a suitable artificial intelligence (AI) model to calculate a difference between two measurement results. Then, the wireless network module 150 can determine if the difference between two measurement results is within a range or lower than a threshold value to determine the similarity between these two measurement results. For example, if the difference between two measurement results is within the range or lower than the threshold value, the wireless network module 150 determines that the measurement result obtained in Step 510 is similar to the measurement result obtained in Step 502; and if the difference between two measurement results is not within the range or not lower than the threshold value, the wireless network module 150 determines that the measurement result obtained in Step 510 is not similar to the measurement result obtained in Step 502.

In Step 514, the wireless network module 150 determines that the UE 100 may be located in the same area without service, so the wireless network module 150 may not perform part of the PLMN and RAT selections. For example, if the previous connection information comprises a specific PLMN and a specific RAT, the wireless network module 150 does not try to select the specific PLMN and the specific RAT.

In Step 516, the wireless network module 150 determines that the UE 100 may be moved to an area with service, so the wireless network module 150 performs the PLMN and RAT selections in the recovery search.

Figure 6:
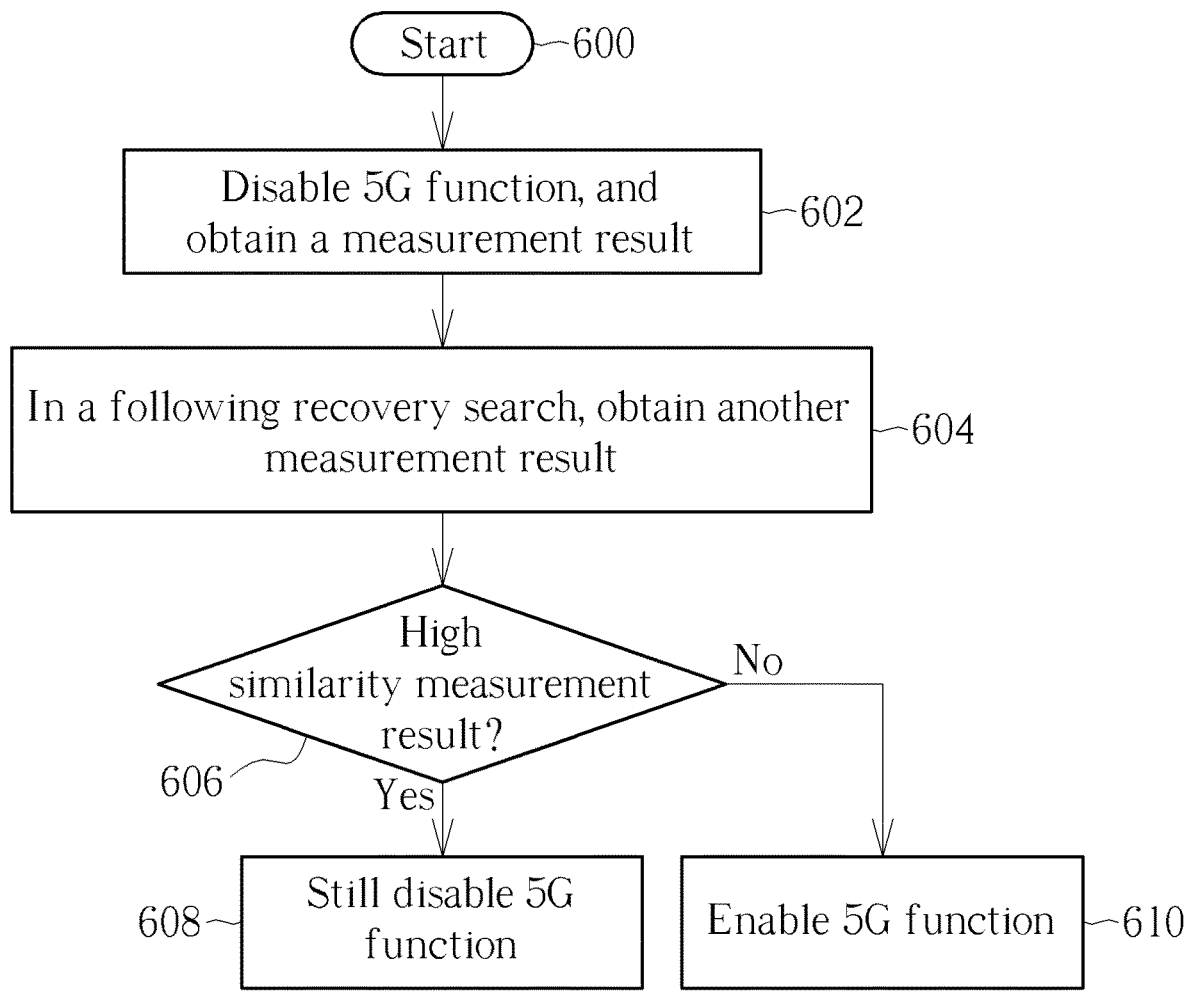
FIG. 6 is a diagram illustrating a control method of the UE according to a third embodiment of the present invention.

FIG. 6 is a diagram illustrating a control method of the UE 100 according to a third embodiment of the present invention. As shown in FIG. 6, in step 600, the flow starts, and the UE 100 is connected to a cellular base station of a system such as the 5G system or the 4G system. In Step 602, the UE 100 disables the 5G function due to some reason, that is the UE 100 does not try to connect to the cellular base station even if the 5G connection is available. For example, the UE 100 may be unable to connect to any cellular base station of the 5G system for a long time, so the wireless network module 150 actively disables the 5G function. In addition, during the recovery search performed by the UE 100, the UE 100 obtains a measurement result of frequencies/channels of one or more bands. For example, the measurement result can be generated according to the above embodiment shown in FIG. 4.

In this embodiment, the measurement result of frequencies/channels of one or more bands can be temporarily stored in a buffer of the wireless network module 150.

In Step 604, in a next recovery search, the wireless network module 150 detects power of all the frequencies or part of the frequencies of one or more bands to obtain a measurement result of frequencies/channels, wherein these frequencies/channels comprise at least part of standalone architecture (SA) FR1 and FR2 bands of the 5G system.

In Step 606, the wireless network module 150 determines the measurement result obtained in Step 604 is similar to the measurement result obtained in Step 602, if yes, the flow enters Step 608; and if not, the flow enters Step 610. In this embodiment, the wireless network module 150 may use any suitable algorithm to determine the similarity between these two measurement results, such as calculating a distance between two measurement results, or using a suitable AI model to calculate a difference between two measurement results. Then, the wireless network module 150 can determine if the difference between two measurement results is within a range or lower than a threshold value to determine the similarity between these two measurement results. For example, if the difference between two measurement results is within the range or lower than the threshold value, the wireless network module 150 determines that the measurement result obtained in Step 604 is similar to the measurement result obtained in Step 602; and if the difference between two measurement results is not within the range or not lower than the threshold value, the wireless network module 150 determines that the measurement result obtained in Step 604 is not similar to the measurement result obtained in Step 602.

In Step 608, the wireless network module 150 determines that the UE 100 may be located in the same area without service, so the wireless network module 150 still disables the 5G function to avoid redundant cell search of the 5G system.

In Step 610, the wireless network module 150 determines that the UE 100 may be moved to an area with service, so the wireless network module 150 enables the 5G function, that is the wireless network module 150 can start to perform cell search of the 5G system.

It is noted that the 5G system mentioned in FIG. 6 is for illustrative purposes only, not a limitation of the present invention. In other embodiments, the 5G function and the 5G system in FIG. 6 can be replaced by any suitable broadband cellular network technology system.

Briefly summarized, in the control method of the UE of the present invention, by comparing the measurement results of the frequencies of one or more bands to determine a suitable system selection strategy, the UE can perform recovery search without doing some redundant steps, to effectively reduce the power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electronic device, comprising:
   obtaining a first measurement result of frequencies of one or more bands, wherein the first measurement result comprises power of each frequency in at least part of the frequencies of the one or more bands;
   obtaining a second measurement result of the frequencies of the one or more bands, wherein the first measurement result and the second measurement result are generated at different times, and the second measurement result comprises the power of each frequency in the at least part of the frequencies of the one or more bands;
   determining a similarity between the second measurement result and the first measurement result to generate a determination result; and
   determining a system selection strategy according to the determination result;
   wherein the first measurement result is generated when the electronic device is without wireless communication service and enters a first recovery search, and the second measurement result is generated when the electronic device is without wireless communication service and enters a second recovery search, wherein an execution time of the second recovery search is later than an execution time of the first recovery search;
   wherein the step of determining the system selection strategy according to the determination result comprises:
   in response to the determination result indicating that the second measurement result is similar to the first measurement result, using a first system selection strategy in the second recovery search or in a following recovery search; and
   in response to the determination result indicating that the second measurement result is not similar to the first measurement result, using a second system selection strategy in the second recovery search or in the following recovery search;
   wherein the step of using the first system selection strategy in the second recovery search or in the following recovery search comprises:
   not performing a cell search corresponding to the frequencies of the one or more bands in the second recovery search or in the following recovery search; and
   the step of using the second system selection strategy in the second recovery search or in the following recovery search comprises:
   performing the cell search corresponding to the frequencies of the one or more bands in the second recovery search or in the following recovery search.

2. The control method of claim 1, wherein the first measurement result and the second measurement result comprise power of each of the frequencies of the one or more bands.

3. A control method of an electronic device, comprising:
   obtaining a first measurement result of frequencies of one or more bands, wherein the first measurement result comprises power of each frequency in at least part of the frequencies of the one or more bands;
   obtaining a second measurement result of the frequencies of the one or more bands, wherein the first measurement result and the second measurement result are generated at different times, and the second measurement result comprises the power of each frequency in the at least part of the frequencies of the one or more bands;
   determining a similarity between the second measurement result and the first measurement result to generate a determination result; and
   determining a system selection strategy according to the determination result;
   wherein the first measurement result is generated when the electronic device is without wireless communication service and enters a first recovery search, and the second measurement result is generated when the electronic device is without wireless communication service and enters a second recovery search, wherein an execution time of the second recovery search is later than an execution time of the first recovery search;
   wherein the step of determining the system selection strategy according to the determination result comprises:
   in response to the determination result indicating that the second measurement result is similar to the first measurement result, using a first system selection strategy in the second recovery search or in a following recovery search; and
   in response to the determination result indicating that the second measurement result is not similar to the first measurement result, using a second system selection strategy in the second recovery search or in the following recovery search;
   wherein the step of using the first system selection strategy in the second recovery search or in the following recovery search comprises:
   not performing a public land mobile network (PLMN) and radio access technology (RAT) selection in the second recovery search or in the following recovery search; and
   the step of using the second system selection strategy in the second recovery search or in the following recovery search comprises:
   performing the PLMN and RAT selection in the second recovery search or in the following recovery search.

4. A circuitry of an electronic device, configured to perform the steps of:
   obtaining a first measurement result of frequencies of one or more bands, wherein the first measurement result comprises power of each frequency in at least part of the frequencies of the one or more bands;
   obtaining a second measurement result of the frequencies of the one or more bands, wherein the first measurement result and the second measurement result are generated at different times, and the second measurement result comprises the power of each frequency in the at least part of the frequencies of the one or more bands;

determining a similarity between the second measurement result and the first measurement result to generate a determination result; and determining a system selection strategy according to the determination result;

wherein the first measurement result is generated when the electronic device is without wireless communication service and enters a first recovery search, and the second measurement result is generated when the electronic device is without wireless communication service and enters a second recovery search, wherein an execution time of the second recovery search is later than an execution time of the first recovery search;

wherein the step of determining the system selection strategy according to the determination result comprises:

in response to the determination result indicating that the second measurement result is similar to the first measurement result, using a first system selection strategy in the second recovery search or in a following recovery search; and in response to the determination result indicating that the second measurement result is not similar to the first measurement result, using a second system selection strategy in the second recovery search or in the following recovery search;

wherein the step of using the first system selection strategy in the second recovery search or in the following recovery search comprises:

not performing a cell search corresponding to the frequencies of the one or more bands in the second recovery search or in the following recovery search; and the step of using the second system selection strategy in the second recovery search or in the following recovery search comprises:

performing the cell search corresponding to the frequencies of the one or more bands in the second recovery search or in the following recovery search.

5. The circuitry of claim 4, wherein the first measurement result and the second measurement result comprise power of each of the frequencies of the one or more bands.

6. A circuitry of an electronic device, configured to perform the steps of:

obtaining a first measurement result of frequencies of one or more bands, wherein the first measurement result comprises power of each frequency in at least part of the frequencies of the one or more bands;

obtaining a second measurement result of the frequencies of the one or more bands, wherein the first measurement result and the second measurement result are generated at different times, and the second measurement result comprises the power of each frequency in the at least part of the frequencies of the one or more bands;

determining a similarity between the second measurement result and the first measurement result to generate a determination result; and determining a system selection strategy according to the determination result;

wherein the first measurement result is generated when the electronic device is without wireless communication service and enters a first recovery search, and the second measurement result is generated when the electronic device is without wireless communication service and enters a second recovery search, wherein an execution time of the second recovery search is later than an execution time of the first recovery search;

wherein the step of determining the system selection strategy according to the determination result comprises:

in response to the determination result indicating that the second measurement result is similar to the first measurement result, using a first system selection strategy in the second recovery search or in a following recovery search; and in response to the determination result indicating that the second measurement result is not similar to the first measurement result, using a second system selection strategy in the second recovery search or in the following recovery search;

wherein the step of using the first system selection strategy in the second recovery search or in the following recovery search comprises:

not performing a public land mobile network (PLMN) and radio access technology (RAT) selection in the second recovery search or in the following recovery search; and the step of using the second system selection strategy in the second recovery search or in the following recovery search comprises:

performing the PLMN and RAT selection in the second recovery search or in the following recovery search.

* * * * *